United States Patent Office 2,882,387
Patented Apr. 14, 1959

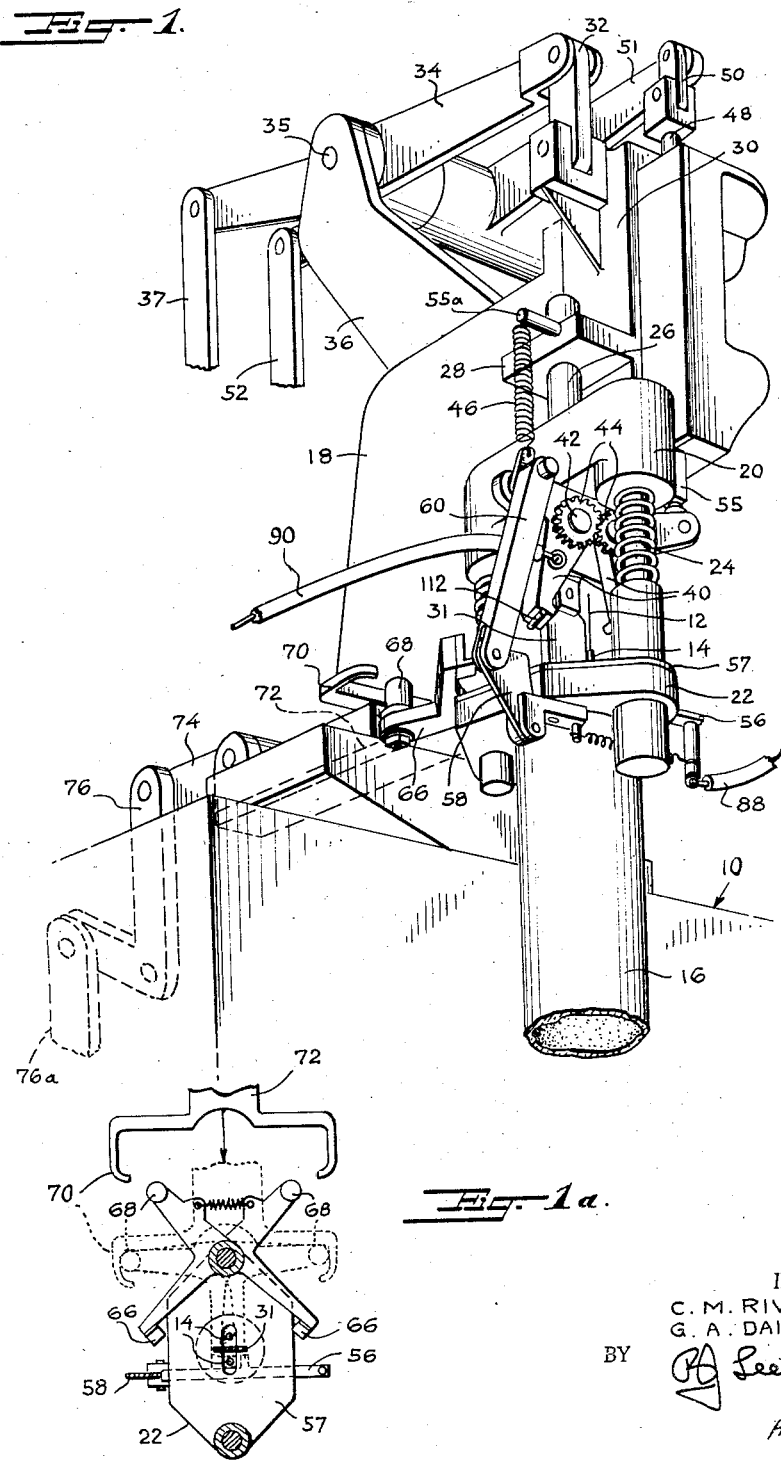

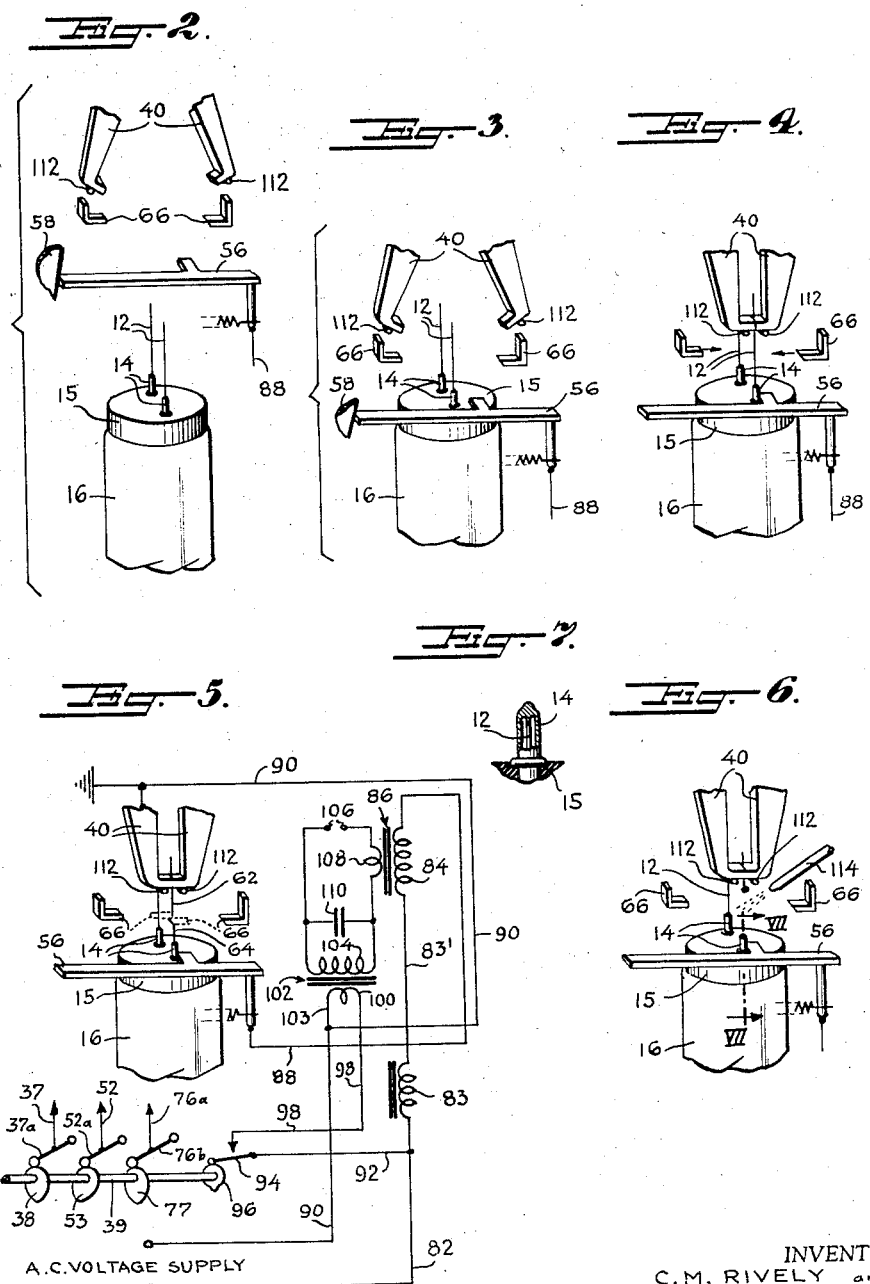

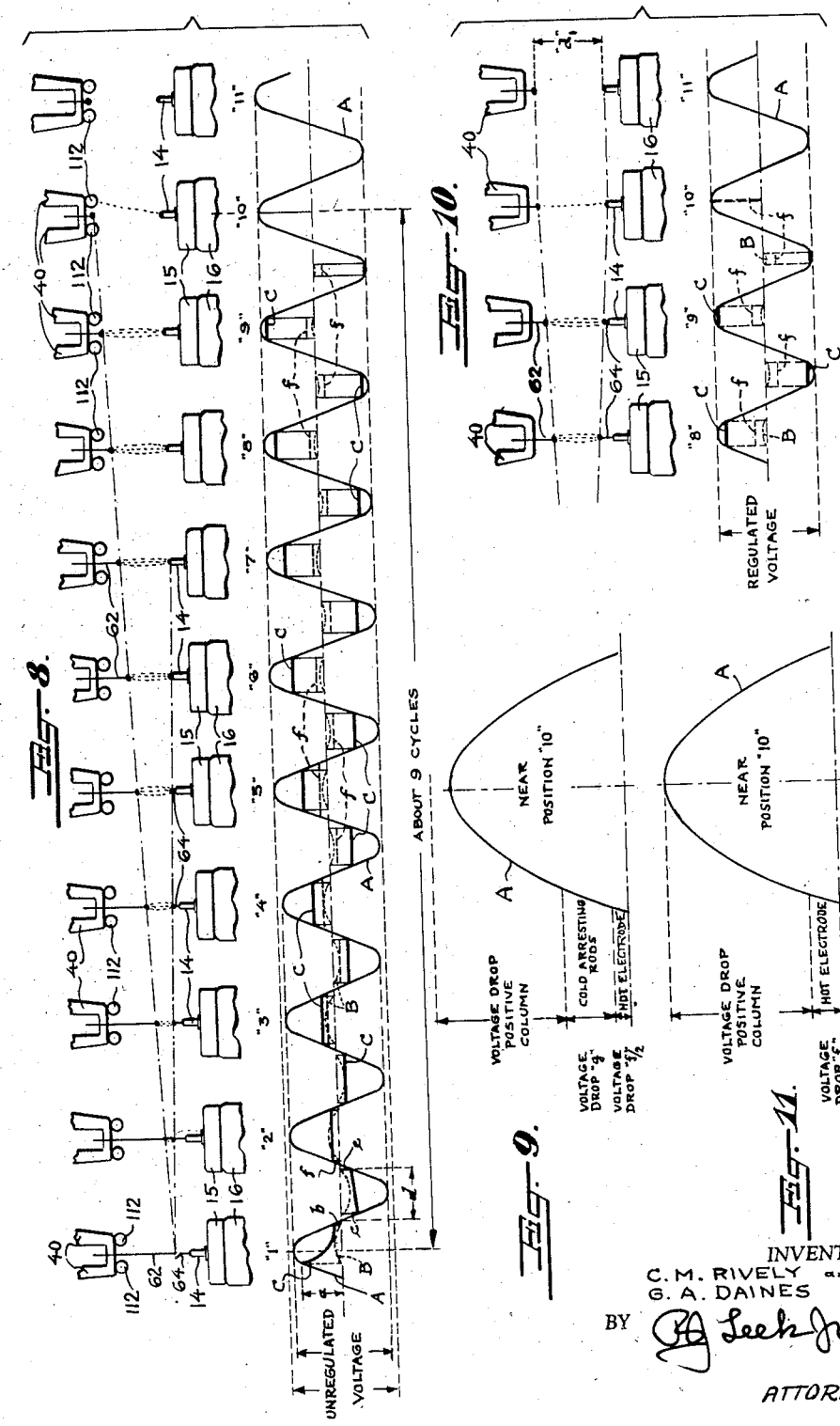

2,882,387

WELDING APPARATUS

Clair M. Rively, White Meadow Lake, and Geoffrey A. Daines, West Caldwell, N.J., assignors to Westinghouse Electric Corporation, East Pittsburgh, Pa., a corporation of Pennsylvania Application May 14, 1957, Serial No. 659,011

17 Claims. (Cl. 219—96)

The present invention relates to welding apparatus and, more particularly, to apparatus for welding a hollow tube to an elongated article protruding therefrom.

In the finishing of discharge lamps, such as for example fluorescent lamps, a base having hollow base pins and prefilled with cement is threaded over the lead wires on each end of the lamp with the lead wires extending through and projecting beyond the ends of the base pins. The base is first heated to remove alcohol vapors from the cement and then cooled to set the cement and thus firmly affix the base to the end of the lamp.

Heretofore the protruding portions of the lead wires have been cut flush with the ends of the base pins and joined to the base pin with a flux type solder. During long periods of storage the solder may corrode and the connections between the lead wires and the pins become defective thereby resulting in an inoperative lamp. In an endeavor to eliminate the defect of corrosion the prior art has resorted to an alternative method of joining the lead wire to the base pin, namely arc welding, but this has not proven practical with any known automatic welding equipment at present rates of lamp manufacture, namely 750 lamps per hour or 3000 welds per hour.

One of the major reasons for automatic arc welding being heretofore impractical is that it requires that provision be made to feed and replace the welding electrodes periodically. This is not feasible without complicated and expensive automatic equipment. In addition, the conventional automatic arc welding equipment is complicated in structure and requires considerable maintenance for the many moving parts.

It is the general object of the present invention to avoid and overcome the foregoing and other difficulties of and objections to prior art practices by the provision of apparatus for automatically welding a hollow tube to an elongated article protruding therefrom.

A specific object of the present invention is the provision of welding apparatus which is simple in structure and provides maintenance-free operation desirable in good automatic production machinery.

Another object of the present invention is the provision of welding apparatus which provides a fresh electrode for each weld and eliminates the need for automatic devices for feeding and replacing the welding electrodes.

An additional object of the present invention is the provision of a welding arc in apparatus for welding a hollow tube to an elongated article protruding therefrom, which arc is automatically extinguished when the tube has been properly fused to the article.

A further object of the present invention is the provision of welding apparatus which eliminates the use of expensive voltage-regulation equipment and prevents the engagement and the sticking of the welding electrode to the welding-electrode gripping means.

A still further object of the present invention is the provision of welding apparatus which automatically disposes of the welding electrode after each weld.

Another object of the present invention is the provision of a new and improved method of joining the lead wires of electric lamps to the metal parts of their bases.

An additional object of the present invention is the provision of welding apparatus adapted to operate in conjunction with a conventional lamp basing machine to weld the lead wire of a fluorescent lamp to the contact pin of the base.

A further object of the present invention is the provision of a fusion-welding system in which the high-frequency, high-voltage pilot potential functions as an ignition switch thereby eliminating the use of conventional contactors and timers and in which the welding potential is automatically interrupted.

The aforesaid objects of the invention, and other objects which will become apparent as the description proceeds, are achieved by providing apparatus for welding a hollow tube to an elongated article protruding therefrom, which apparatus comprises means for gripping the protruding portion of the article while the article is in the extended position, means for cutting the gripped-protruding portion a predetermined distance from the tube and means for applying a welding potential between the gripping means and the tube to form retreating balls of molten metal on the respective ends of the severed-protruding portion and the severed-gripped portion and to seat the ball on said severed-protruding portion in said tube.

Referring now to the accompanying drawings in which like numerals of reference indicate similar parts throughout the several views:

Fig. 1 is a perspective view of the upper portion of a based fluorescent lamp secured in a welding head forming a part of the invention and showing the welding head in the "down" position with the wire gripping jaws and cutters in the open position and the base pin contact slide in the "out" position.

Fig. 1a is a fragmentary plan view of the cutters for severing the gripped protruding portion of the lead wire and showing the retracted position thereof in solid lines and the severing position thereof in dotted lines.

Fig. 2 is a diagrammatic side elevational view of the wire gripper jaws, cutters and slide in the "up" position, as the lamp is indexed into the first of the two welding stations of the basing machine.

Fig. 3 is a view similar to Fig. 2 and showing the jaws, cutters and slide in the "down" position.

Fig. 4 is a view similar to Figs. 2 and 3 and showing the jaws in the closed position about an extended lead wire protruding from a base pin and the slide in engagement with the base pin.

Fig. 5 is a view similar to Figs. 2–4 and showing the fusion-welding system diagrammatically and the electrode portions of the lead wire after severing and bending by the cutters preparatory for the welding operation.

Fig. 6 is a view similar to Figs. 2–5 and showing the retreating ball of molten metal on the protruding electrode seated in the base pin to form a good electrical contact therebetween.

Fig. 7 is an enlarged fragmentary vertical sectional view of the fused lead wire and base pin along the line VII—VII of Fig. 6 in the direction of the arrows.

Fig. 8 is a view, the upper portion of which illustrates inn side elevation, the progress of the fusion welding of the lead wire to the base pin and depicting diagrammatically in the lower portion thereof the unregulated wave form of the "A.C. Voltage Supply" or applied welding potential (shown in light solid lines), the attendant changes in the potential drop between the electrodes during each one-half cycle of unregulated welding potential and the welding current in the welding arc during the same period and further illustrating the use of arc arresting rods for preventing the engagement of the retreating ball of molten metal on the gripped electrode with the gripping jaws in which the electrode is secured.

Fig. 9 is an enlarged diagrammatic view of the tenth positive half cycle of the welding potential and showing the stage in the fusion-welding operation where the gap between the electrodes has increased to such an extent that the welding potential is no longer sufficient to sustain the arc discharge and because the potential drop between the electrodes, exceeds the available welding potential.

Fig. 10 is a fragmentary view similar to Fig. 8 illustrating the final stages of the welding operation when the "A.C. Voltage Supply" or welding potential is voltage regulated.

Fig. 11 is a view similar to Fig. 9 and showing the stage in the fusion-welding operation where the welding potential is voltage regulated and where the potential drop between the electrodes equals the welding potential and the arc discharge is about to be automatically extinguished.

Although the principles of the invention are broadly applicable to the welding of a hollow tube to an elongated article protruding therefrom, the invention is particularly adapted for the welding of a base pin of a fluorescent lamp to a lead wire protruding from said pin and hence it has been so illustrated and will be so described.

With specific reference to the form of the invention illustrated in the drawings, the frame portions (Fig. 1) of a fluorescent lamp basing machine, such as shown in U.S. Patent No. 2,764,953, issued October 2, 1956 to D. Mullan, are generally indicated by the reference numeral 10.

To provide mounting means for a vertically reciprocable upper-welding head of the present invention, employed to fuse a lead wire 12 (Figs. 1–4) to a base pin 14 of a base 15 of a fluorescent lamp 16, a casting 18 (Fig. 1) is secured to the frame portions 10 of the basing machine, as by bolts, (not shown). One convenient way of reciprocably mounting an upper portion 20 (Fig. 1) of the upper-welding head is to affix it to a rod 26 depending from a lug 28 projecting from a slide 30 reciprocable in a guideway provided in the upper portions of the casting 18. The upper portion 20 resiliently carries a lower portion 22 by means of spring biased mount rods 24. The lower portion 22 is suitably fabricated from an electrically insulating material and is provided with a base receiving cavity (Fig. 1) adapted to permit the base pins 14 and protruding lead wires 12 to project beyond the upper surface of the lower portion 22 on either side of an insulating shield 31 upstanding from the lower portion 22. This shield 31, which may be of any well-known high-dielectric material, such as mica or the like, is employed to insulate the base pin 14 and associated lead wire 12, which are not being fusion welded by the welding head at the moment, from the high voltage employed to weld the adjacent pin 14 and wire 12 during such moment.

Since the means for reciprocating the slide 30 is conventional, it is sufficient to say that a link 32 connects the slide 30 to a lever 34 pivoted on a shaft 35 secured in a pair of brackets 36 (only one of which is shown in Fig. 1) upstanding from the casting 18, which lever 34 is joined by a connecting rod 37 to a lever 37a (Fig. 5) driven by a cam 38 on the main cam shaft 39 of the basing machine. Upward movement of the connecting rod 37 rotates the lever 34 in clockwise direction, as viewed in Fig. 1, to move the slide 30 and the upper-welding head downwardly to permit the lower portion 22 of the upper-welding head to receive the upper base 15 (Fig. 2) in the position shown in Fig. 1. Conversely, downward movement of the connecting rod 37 moves the slide 30 and the welding head to the "up" position (not shown in Fig. 1) to permit the indexing of a lamp 16 into and out of the welding station of the basing machine shown in Fig. 1.

For the purpose of providing means for gripping the protruding portion of one of the lead wires 12 while in the extended position, a pair of generally L-shaped wire-gripping jaws 40 (Figs. 1, 2–6, 8 and 10) are affixed to, and electrically insulated by a dielectric bushing (not shown) from, a pair of protruding shafts 42 journalled in the upper portion 20 of the welding head. One satisfactory way of providing operating means for moving the jaws 40 from the open position, shown in Figs. 1 and 2–3 to the closed position shown in Figs. 4–6 is to mount meshing pinion gears 44 on the shafts 42 (Fig. 1) and bias the jaws to the normally open position by means of a spring 46 on the left-hand jaw 40, as viewed in Fig. 1. In order to move the jaws 40 to their closed position against the tension of the spring 46, the right-hand jaw 40 is contacted by the depending end of a vertically extending plunger 48 reciprocable in the casting 18 by a plunger reciprocating mechanism.

Such mechanism comprises a link 50 for connecting the upper end of plunger 48 to a lever 51 on the shaft 35, and a connecting rod 52 for transmitting motion from a lever 52a (Fig. 5) and a cam 53 on the main cam shaft 39 of the basing machine, to the lever 51. It will be understood that the plunger 48 carries a dielectric insulating pad 55 on its lower jaw-engaging end to insulate the right-hand jaw 40, as viewed in Fig. 1, from the frame portions 10 of the basing machine and that the upper end of the spring 46 is also affixed to the dielectric pin 55a projecting from the lug 28 on the slide 30, to similarly insulate the left-hand jaw 40 from the frame portions 10.

After the reciprocating mechanism for the upper-welding head has lowered the lower portion 22 of the welding head from the position shown in Fig. 2 into resilient engagement with the base 15, so that the base pins 14 and the protruding lead wires 12 project above the lower portion 22 on either side of the shield 31, upward movement of the connecting rod 52, rotates the lever 51 in clockwise direction, as viewed in Fig. 1, thus moving the plunger 48 downwardly into contact with the right-hand jaw 40 and causing rotation of the right-hand jaw 40 and right-hand gear 44 in clockwise direction, as viewed in Fig. 1. This rotation of the right-hand gear 44 simultaneously rotates the left-hand gear 44 and the left-hand jaw 40 in counterclockwise direction against the bias of the spring 46 and causes closing of the jaws 40 about the protruding lead wire 12 while in the extended position. Conversely, downward movement of the connecting rod 52 (Fig. 1) moves the plunger 48 upwardly to disengage contact of its depending end from the right-hand jaw 40, as viewed in Fig. 1, and permits the spring 46 to return the jaws 40 to the open position shown in Figs. 1, 2 and 3.

For the satisfactory operation of the upper-welding head it is desirable to provide means, such as a metallic slide 56 (Figs. 1 and 2–6) which is reciprocable horizontally in the lower portion 22 of the welding head and retained therein by a dielectric cover 57, for making electrical contact with the base pin 14 which is to be fusion welded to its associated protruding lead wire 12. As shown in Fig. 1, the slide 56 is spring-biased into engagement with a cam 58 pivoted on a bracket depending from the lower portion 22 of the upper-welding head, which cam 58 is connected to an electrically insulating operating arm 60, pivotable on a shaft projecting from the left-hand jaw 40, as viewed in Fig. 1. Counterclockwise rotation of the left-hand jaw 40 from the open position (Fig. 1) to the closed position (Fig. 4) by the above described jaw-operating mechanism, simultaneously moves the cam 58 in counterclockwise direction, as viewed in Fig. 1, to permit the spring-biased slide 56 to move to the left in the lower portion 22 of the upper-welding head from its position in Fig. 3 into contact with the base pin 14, as shown in Fig. 4. Conversely, movement of the jaws 40 from the closed position to the open position allows the spring-tension to return the slide 56 to the position shown in Fig. 1.

Various means may be utilized to sever the gripped protruding portion (Fig. 4) of the lead wire 12 a predetermined distance from the base pin 14 to thereby provide a pair of welding electrodes 62 and 64 (Figs. 5, 8 and 10), and to bend the end of one electrode 64 or the ends of both electrodes 62 and 64 as desired, to provide a suitable welding gap therebetween. The form of the invention illustrated employs a pair of L-shaped cutters 66 (only one of which is shown in Fig. 1 but simulating "ice-tongs"). The cutters 66 are pivoted on the lower portion 22 of the upper-welding head and normally biased to the open position shown in Figs. 1–6 by a spring, and provided with cam engaging means, such as a roller 68, carried by a pin upstanding from each cutter 66.

The mechanism for closing the cutters 66 about the extended gripped lead wire 12 shown in Figs. 4 and 5 comprises a U-shaped cam 70 (Figs. 1 and 1a) carried on the forward end of a slide 72 reciprocable toward and away from the lamp 16 (Fig. 1) in a suitable guideway in the frame portion 10 adjacent the upper-welding head. Such reciprocation is accomplished by a conventional means consisting of a link 74 and a bell crank lever 76 driven through conventional linkage, such as a connecting rod 76a and a lever 76b (Fig. 5), by a cam 77 on the main cam shaft 39 of the basing machine.

After the gripping jaws 40 have secured the extended lead wire 12 therein and the slide 56 has simultaneously engaged the base pin 14, reciprocation of the slide 72 by the above noted mechanism moves the cam 70 (Figs. 1 and 1a) into engagement with the rollers 68 on the cutters 66 to move the cutters inwardly toward each other against their spring bias to the dotted position shown in Figs. 1a and 5 and thus causes such cutters to sever the gripped-extended lead wire 12 a predetermined distance from the base pin 14. When so severed, the upper-gripped electrode 62 and the lower protruding electrode 64 are thus formed with the end of the electrode 64 being bent to provide a suitable welding gap therebetween. Retraction of the slide 72 permits the spring-biased cutters 66 to return to the solid line position shown in Figs. 1–6.

When the severing of the lead wire 12 to form the "lead-wire" electrodes 62 and 64 and the bending of the electrode 64 has been accomplished, an electric-fusion-welding system (Figs. 1 and 5) is energized to form retreating balls of molten metal on the ends of the "lead-wire" electrodes 62 and 64 and to seat the ball on the protruding electrode 64 in the base pin 14 a predetermined amount (Fig. 7).

*Fusion welding system*

Since the conveyor (not shown) of the basing machine indexes the lamps 16 successively from one work station to another, it is essential that the welding potential of the fusion-welding system be switched off before the indexing of a welded lamp 16 by the conveyor out of the welding station and that such potential be switched on again at the desired time after the indexing of the next lamp 16 to be welded into the welding station. To avoid the use of large conventional contactors which will not withstand such a switching operation, occurring necessarily at the rate of 1500 operations per hour, the form of the invention illustrated employs an alternating current "weld-power" circuit (Fig. 5) of low voltage and heavy current for fusing the lead wire 12 to the base pin 14, a "high-frequency-generator" circuit for providing a high-frequency, high-voltage, low-current pilot or breakdown arc which initiates and restrikes the welding arc of the "weld-power" circuit every half cycle and a "power-supply" circuit for the "high-frequency-generator" circuit. When a voltage-regulated welding potential power supply (Figs. 10 and 11) is employed in the fusion-welding system and further when the retreating balls on the electrodes 62 and 64 are spaced a predetermined distance "d" from each other, the welding potential is no longer capable of continuing the welding arc and the welding arc is automatically extinguished.

The "weld-power" circuit (Fig. 5) extends from one side of a conventional voltage-regulated supply, indicated generally by the legend, "A.C. Voltage Supply," through a conductor 82 to one side of a choke or ballasting inductance 83, through a conductor 83' to one side of a secondary winding 84 of a pulse transformer 86, for superimposing the high-frequency output of the "high-frequency-generator" circuit on the "weld-power" circuit and from the other side of such winding 84 through a conductor 88 to the slide 56, through the slide 56, base pin 14, protruding "lead-wire" electrode 64, the welding arc, gripped "lead-wire" electrode 62 to the left-hand gripping jaw 40, as viewed in Fig. 5. The gripping jaw 40 is connected to ground and to the other side of the voltage supply by a conductor 90. However, welding-power from this "weld-power" circuit is not supplied to the electrodes 62 and 64 until the break-down of the gap and the initiation of the welding arc across the electrodes 62 and 64 by the output of the "high-frequency-generator" circuit.

The "power-supply" circuit for the "high-frequency-generator" circuit extends from the line-voltage conductor 82 through a conductor 92 connected at a junction point with the conductor 82, and extending to one side of a switch 94 operated by a cam 96 on the main cam shaft 39 of the basing machine, and from the other side of the switch 94 by a conductor 98 to one side of a primary winding 100 of a transformer 102 employed for supplying power to the "high-frequency-generator" and from such winding 100, through a conductor 103 to a junction with the other line voltage conductor 90. Hence, closure of the switch 94 by the cam 96 at a predetermined time after the conveyor (not shown) of the basing machine has indexed a lamp 16 into the welding station energizes this "power-supply" circuit to render the "high-frequency-generator" circuit also operative.

The "high-frequency-generator" circuit comprises the high-voltage secondary winding 104 of the transformer 102, which is connected by suitable conductors to spaced electrodes 106 of a spark gap and includes a tank circuit comprising the primary winding 108 of the aforementioned pulse transformer 86 and a capacitance 110 resonantly tuned to provide a high-frequency generating output in the secondary winding 84 of the pulse transformer 86 in the "weld-power" circuit.

To eliminate the need of expensive voltage-regulating equipment, an unregulated "A.C. Voltage Supply" (Figs. 5 and 8) or welding potential may be employed for the fusion-welding system. In the lower portions of Fig. 8, the wave form of such an unregulated welding potential is indicated by the sinusoidal line "A." When the switch 94 (Fig. 5) is closed by the cam 96, the "weld-power" circuit and the transformer 102 in the "power-supply" circuit are energized and the high-frequency output of the "high-frequency-generator" circuit is initially superimposed on the first half-cycle of the welding potential, shown in the lower portion of Fig. 8. When the energy from both circuits is simultaneously applied to the electrodes 62 and 64 in position "1" of the upper portion of Fig. 8, the gap between the "lead wire" electrodes 62 and 64 becomes ionized by the high-frequency output when the welding potential reaches a value of "a" on the sinusoidal wave form "A," thereby reducing the resistance across the said gap and permitting the welding current, indicated by the dotted arcuate line "B" in the lower portions of Fig. 8, to follow the high-frequency output (not shown in Fig. 8) of the "high-frequency- "generator" circuit across said gap. During this first positive half-cycle the potential drop between the electrodes 62 and 64 fluctuates, as shown by the heavy solid line "C" in the lower portion of Fig. 8, and the discharge ceases when the welding potential falls off to a value "b."

The high-frequency output of the "high-frequency-generator" circuit restrikes the arc of the "weld-power" circuit on the first negative half-cycle of the welding potential when the welding potential reaches the negative value "c" shown on the sinusoidal line "A" in the lower portions of Fig. 8.

As is well known in the art and as shown in Fig. 8, the initial corona discharge established between the electrodes 62 and 64 may successively change, during this first cycle of the welding potential, to a glow discharge, and finally to an arc discharge which stabilizes itself, in the example chosen, at the time "d" in the first negative half-cycle of the welding potential, at which time the molten balls on the ends of the electrodes 62 and 64 have been formed and the potential drop across the electrodes has reached the value "e" (Fig. 8).

It will be understood that after the arc discharge has been stabilized at the end of the first cycle of welding potential, in the example chosen, the total potential drop between the electrodes 62 and 64 then consists of two potential drops; first a constant potential drop "f" indicated by the straight dotted lines extending across the wave form "A" in the lower portion of Fig. 8 from position 2 to position 9 thereof and involved in maintaining the ends of the electrodes 62 and 64, positions 2-9 in the upper portion of Fig. 8, at the electrode emitting temperature and further causing the retreating movement of the molten balls on the ends of the electrodes 62 and 64, and secondly, an increasing potential drop across the lengthening ionized gap or positive column of the welding arc which is indicated in Fig. 8 by the ordinate difference between the straight dotted lines "f" and the heavy solid line "C" in each half-cycle of Fig. 8.

During the succeeding cycles of welding potential (Fig. 8) the retreating balls of molten metal on the ends of the electrodes 62 and 64 move through the successive positions 3 through 9, with attendant lengthening of the gap therebetween and an associated increase in the potential drop "C" in the positive column or welding arc. As shown at position 7 in Fig. 8, the molten ball on the protruding electrode 64 engages the base pin 14 and the fusion therebetween begins and continues until the molten ball on the protruding electrode 64 has burned into the pin 14 a sufficient distance and alloys therewith a sufficient amount to provide good electrical and mechanical contact therebetween, such as shown more in detail in Fig. 7.

If, however, a momentary increased voltage peak occurs in the last half-cycle of the welding operation (at position 9 of Fig. 8) this increased peak may cause the retreating ball of molten metal on the end of the electrode 64 to burn into the pin 14 too far and further cause the ball on the gripped electrode 62 to engage and stick to the gripping jaws 40. It is therefore desirable to provide a refractory metal arc-arresting rod 112 (Figs. 1-6 and 8) secured to the bottom face of each gripping jaw 40 which rod, relative to the molten ball on the electrode 62, is rather massive and relatively cold. As the retreating ball on the electrode 62 reaches a point adjacent the rods 112 (positions 8 and 9 of Fig. 8) the high-frequency output of the "high-frequency-generator" circuit begins to also strike the rods 112. By the time the molten ball has retreated behind the rods 112 (position 10 of Fig. 8) the high-voltage low-current pilot arc naturally assumes the shortest path and strikes the forwardly disposed rod or rods 112 and the welding arc likewise shifts from the hot, but now shielded, electrode 62 to the massive cold rod or rods 112. At this point in the welding operation the welding potential required (Fig. 9) to continue the arc discharge would now be greatly increased by the relatively large potential drop "g" (Fig. 9) attendant to extracting electron emission from the cold rod which added to the potential drop of the positive column represents an amount shown by the dotted line above the peak of the voltage curve, thus indicating that the total potential drop is higher than the total potential available (Fig. 9). The welding arc is thereby automatically extinguished and the molten ball on the end of the gripped electrode 62 is permitted to cool in the atmosphere. This potential drop incurred in the heating of the rod 112 to emitting temperature is approximately ten times the potential drop resulting from the heating of the ends of the "lead-wire" electrodes 62 and 64 to emitting temperature.

Meanwhile the retreating molten ball on the protruding electrode 64 has moved downwardly toward the base pin 14 and seated itself in the hole in the end of the pin 14 to the predetermined depth (Fig. 7) as above mentioned.

However, in the situation shown in Fig. 10 where the welding potential available from the "A.C. Voltage Supply" is voltage regulated by conventional stabilizing apparatus, such as shown in U.S. Patent No. 2,460,990, issued February 8, 1949, to J. A. Kratz et al., a momentary increased voltage peak in the last half-cycle of the welding operation is eliminated. Thus, when the total potential drop between the electrodes 62 and 64 (which drop is indicated by the line "C" and comprises the potential drop "f" (Fig. 10) and the positive-column potential drop) equals the welding potential of the "weld-power" circuit (Fig. 11) near position 10 of Fig. 10, the welding arc is ready for automatic extinction. This arc extinction occurs desirably at the time when the spacing between the molten balls on the electrodes are spaced a distance, "$d_1$," apart (Fig. 10) and when the molten ball on the electrode 64 has alloyed with the pin 14 a sufficient predetermined amount to provide good electrical and mechanical contact therebetween (Fig. 7). Thereafter the welding potential is too low to reestablish the welding arc despite the continued application of the high-frequency output of the "high-frequency-generator" circuit between the electrodes 62 and 64 on succeeding half-cycles of the welding potential of the "weld-power" circuit.

The gripping jaws 40 are then opened by the plunger reciprocating mechanism to the position shown in Fig. 3 and the released gripped electrode 62 is blown by an air jet from a nozzle 114 (Fig. 6), disposed on the frame portions 10 of the basing machine adjacent the jaws 40, into a disposal chute (not shown). The upper-welding head is then moved upwardly, as viewed in Figs. 1 and 2, by the means for reciprocating the slide 30, to the position shown in Fig. 2 to permit the indexing of the welded lamp 16 by the conveyor (not shown) of the basing machine from the welding station shown in Fig. 1, and into a similar adjacent welding station (not shown) where the other upper lead wire 12 is similarly welded to the other upper base pin 14. It will be understood that a similar lower-welding head (not shown) is provided at the same welding stations hereinbefore mentioned for simultaneously welding the lead wires 12 projecting from the base pins 14 on the lower base 15 of the lamp 16.

It will be recognized that the objects of the invention have been achieved by providing a welding apparatus for and a method of welding a base pin of a fluorescent lamp to a lead wire protruding therefrom and a fusion-welding system which automatically extinguishes the welding arc in the "weld-power" circuit when a satisfactory mechanical and electrical contact has been achieved between the parts. In addition, the welding apparatus provides simple and substantially maintenance-free high speed operation, eliminates the use of heavy contractors, Weldotrol units, and timers, and by providing a fresh electrode for each weld eliminates the need for automatic devices for feeding and replacing the welding electrodes. Further, the welding apparatus automatically eliminates the need for voltage regulators and prevents the gripped electrode from sticking to the gripping jaws and automatically disposes of the unused gripped electrode after each weld.

As a possible alternative embodiment it should be noted that hollow tubes, other than a base pin of a fluorescent lamp, may be welded to an elongated article protruding therefrom, other than a lead wire in accordance with the teachings of this invention.

While in accordance with the patent statutes, one best known embodiment of the invention has been illustrated and described in detail, it is to be particularly understood that the invention is not limited thereto or thereby.

We claim:

1. Apparatus for welding a hollow tube to an elongated article protruding therefrom, comprising means for supporting the protruding portion of said article, means for cutting the protruding portion of said article a predetermined distance from said tube to thereby provide a pair of welding electrodes including a protruding electrode and a supported electrode, means for applying a welding potential to said electrodes to provide a welding arc therebetween and thereby forming retreating balls of molten metal on the respective ends of said electrodes, said means for applying a welding potential being operable to sustain said welding arc until the molten ball on said protruding electrode seats in said tube to form a good electrical contact between said article and said tube.

2. Apparatus for welding a base pin of a discharge lamp to a lead wire protruding from said pin, comprising an electrode, means for supporting said electrode a predetermined distance from said wire, and means for applying a welding potential to said electrode and said wire to provide a welding arc therebetween and thereby forming retreating balls of molten metal on the respective ends of said electrode and said wire, said means for applying a welding potential being operable to sustain said welding arc until the molten ball on said protruding wire seats in said pin to form a good electrical contact between said wire and said pin.

3. Apparatus for welding a base pin of a discharge lamp to a lead wire protruding from said pin, comprising means for holding said lamp, means for gripping the protruding portion of said wire while said protruding portion is in an extended position, means for cutting the gripped protruding portion of said wire a predetermined distance from said pin to thereby provide a pair of welding electrodes including a protruding electrode and a gripped electrode, means for bending at least one of the ends of said electrodes to provide a suitable welding gap therebetween and means for applying a welding potential between said electrodes to provide a welding arc therebetween and thereby forming retreating balls of molten metal on the respective ends of said electrodes said means for applying a welding potential being operable to sustain said welding arc until the molten ball on said protruding electrode seats in said pin to form a good electrical contact between said wire and said pin.

4. Apparatus for welding a base pin of a discharge lamp to a lead wire protruding from said pin, comprising means for gripping the protruding portion of said wire while said protruding portion is in an extended position, means for cutting the gripped protruding portion of said wire a predetermined distance from said pin to thereby provide a pair of welding electrodes including a protruding electrode and a gripped electrode, means for bending the ends of said electrodes to provide a suitable welding gap therebetween, and means for applying a welding potential between said electrodes to provide a welding arc therebetween and thereby forming retreating balls of molten metal on the respective ends of said electrodes, said means for applying a welding potential being operable to sustain said welding arc until the molten ball on said protruding electrode seats in said pin to form a good electrical contact between said wire and said pin and arc-arresting means adjacent said gripping means for stopping the retreating movement of the ball on said gripped electrode and for preventing said ball on said gripped electrode from engaging and sticking to said gripping means.

5. Apparatus for welding a base pin of a discharge lamp to a lead wire protruding from said pin, comprising means for gripping the protruding portion of said wire while said protruding portion is in an extended position, means for cutting the gripped protruding portion of said wire a predetermined distance from said pin to thereby provide a pair of welding electrodes including a protruding electrode and a gripped electrode, means for bending the ends of said electrodes to provide a suitable welding gap therebetween, and means for applying a welding potential between said electrodes to provide a welding arc therebetween and thereby forming retreating balls of molten metal on the respective ends of said electrodes, said means for applying a welding potential being operable to sustain said welding arc until the molten ball on said protruding electrode seats in said pin to form a good electrical contact between said wire and said pin and means for disposing of said gripped electrode when released from said gripping means.

6. Apparatus for welding a base pin of a discharge lamp to a lead wire protruding from said pin, comprising means for gripping the protruding portion of said wire while said protruding portion is in an extended position, means for cutting the gripped protruding portion of said wire a predetermined distance from said pin to thereby provide a pair of welding electrodes including a protruding electrode and a gripped electrode, means for bending the ends of said electrodes to provide a suitable welding gap therebetween, and means for applying a welding potential between said electrodes to provide a welding arc therebetween and thereby forming retreating balls of molten metal on the respective ends of said electrodes, said means for applying a welding potential being operable to sustain said welding arc until the molten ball on said protruding electrode seats in said pin to form a good electrical contact between said wire and said pin, said welding arc being automatically extinguished when the distance between said balls on said electrodes reaches a predetermined length and the welding potential is no longer capable of continuing the welding arc and when said ball on said protruding electrode has alloyed with said pin a predetermined amount.

7. Apparatus for welding a base pin of a discharge lamp to a lead wire protruding from said pin, comprising means for holding said lamp, means for gripping the protruding portion of said wire while said protruding portion is in an extended position, means for cutting the gripped protruding portion of said wire a predetermined distance from said pin to thereby provide a pair of welding electrodes including a protruding electrode and a gripped electrode, means for bending the ends of said electrodes to provide a suitable welding gap therebetween, an means for applying a welding potential between said electrodes to provide a welding arc therebetween and thereby forming retreating balls of molten metal on the respective ends of said electrodes, said means for applying a welding potential being operable to sustain said welding arc until the molten ball on said protruding electrode seats in said pin to form a good electrical contact between said wire and said pin and arc-arresting means adjacent said gripping means for stopping the retreating movement of the ball on said gripped electrode and for preventing said ball on said gripped electrode from engaging and sticking to said gripping means.

8. Apparatus for welding a base pin of a discharge lamp to a lead wire protruding from said pin, comprising means for holding said lamp, means for gripping the protruding portion of said wire while said protruding portion is in an extended position, means for cutting the gripped protruding portion of said wire a predetermined distance from said pin to thereby provide a pair of welding electrodes including a protruding electrode and a gripped electrode, means for bending the ends of said electrodes to provide a suitable welding gap therebetween, and means for applying a welding potential between said electrodes to provide a welding arc therebetween and thereby forming retreating balls of molten metal on the respective ends of said electrodes, said means for applying a welding potential being operable to sustain said welding arc until the molten ball on said protruding electrode seats in said pin to form a good electrical contact between said wire and said pin, arc-arresting means adjacent said gripping means for stopping the retreating movement of the ball on said gripped electrode and for preventing said ball on said gripped electrode from engaging and sticking to said gripping means, means for disposing of said gripped electrode when released from said gripping means, said welding arc being automatically extinguished when the distance between said balls on said electrodes reaches a predetermined length and the welding potential is no longer capable of continuing the welding arc and when said ball on said protruding electrode has burned into and alloyed with said pin a predetermined amount.

9. The method of welding an elongated article protruding from a tube which comprises the steps of gripping a protruding portion of said article while said protruding portion is in an extended position, cutting the gripped protruding portion of said article a predetermined distance from said tube to thereby provide a pair of welding electrodes including a protruding electrode and a welding electrode, applying a welding potential to said electrodes to provide a welding arc therebetween and thereby forming retreating balls of molten metal on the respective ends of said electrodes, and continuing the application of the welding potential until the ball on said protruding electrode is seated in said tube to form a good electrical contact between said article and said tube.

10. The method of welding an elongated article protruding from a tube which comprises the steps of gripping a protruding portion of said article while said protruding portion is in an extended position, cutting the gripped protruding portion of said article a predetermined distance from said tube to thereby provide a pair of welding electrodes including a protruding portion and a gripped portion, bending the end of one of said electrodes to provide a suitable welding gap therebetween and applying a welding potential to said electrodes to provide a welding arc therebetween and thereby forming retreating balls of molten metal on the respective ends of said electrodes, and continuing the application of the welding potential for a period of time sufficient to cause the ball on said protruding electrode to be seated in said tube to form a good electrical contact between said article and said tube.

11. The method of welding an elongated article protruding from a tube which comprises the steps of gripping a protruding portion of said article while said protruding portion is in an extended position, cutting the gripped protruding portion of said article a predetermined distance from said tube to thereby provide a pair of welding electrodes including a protruding electrode and a gripped electrode, applying a welding potential to said electrodes to provide a welding arc therebetween and thereby forming retreating balls of molten metal on the respective ends of said electrodes, continuing the application of the welding potential until the ball on said protruding electrode is seated in said tube to form a good electrical contact between said article and said tube, and arresting the retreating movement of the ball on said gripped electrode to prevent the latter from engaging and sticking to said gripped electrode.

12. The method of welding an elongated article protruding from a tube which comprises the steps of gripping a protruding portion of said article while said protruding portion is in an extended position, cutting the gripped protruding portion of said article a predetermined distance from said tube to thereby provide a pair of welding electrodes including a protruding electrode and gripped electrode, applying a welding potential to said electrodes to provide a welding arc therebetween and thereby forming retreating balls of molten metal on the respective ends of said electrodes, continuing the application of the welding potential until the ball on said protruding electrode is seated in said tube to form a good electrical contact between said article and said tube, and extinguishing said welding arc when the ball on said protruding electrode has burned into said tube a predetermined amount.

13. The method of welding an elongated article protruding from a tube which comprises the steps of gripping a protruding portion of said article while said protruding portion is in an extended position, cutting the gripped protruding portion of said article a predetermined distance from said tube to thereby provide a pair of welding electrodes including a protruding electrode and a gripped electrode, bending the ends of said electrodes to provide a suitable welding gap therebetween, applying a welding potential to said electrodes to provide a welding arc therebetween and thereby forming retreating balls of molten metal on the respective ends of said electrodes, continuing the application of the welding potential until the ball on said protruding electrode is seated in said tube to form a good electrical contact between said article and said tube, and arresting the retreating movement of the ball on said gripped electrode when an increased voltage peak in said welding potential occurs to prevent the latter from engaging and sticking to said gripped electrode.

14. The method of welding a lead wire protruding from a base pin of a fluorescent lamp which comprises the steps of gripping a protruding portion of said wire, cutting the gripped protruding portion of said wire a predetermined distance from said pin to thereby provide a pair of welding electrodes including a protruding electrode and a gripped electrode, bending the end of one of said electrodes to provide a suitable welding gap therebetween, applying a welding potential to said electrodes to provide a welding arc therebetween and thereby forming retreating balls of molten metal on the respective ends of said electrodes, continuing the application of the welding potential until the ball on said protruding electrode is seated in said pin to form a good electrical contact between said wire and said pin, arresting the retreating movement of the ball on said gripped electrode to prevent the latter from engaging and sticking to said gripped electrode, extinguishing said welding arc when the ball on said protruding electrode has burned into and alloyed with said pin a predetermined amount, and disposing of said gripped electrode.

15. In an electric-fusion-welding system the combination, comprising an elongated article protruding from a tube, an extended portion of said article being gripped and cut at a predetermined point from said tube to provide a pair of welding electrodes including a protruding electrode and a gripped electrode, an alternating-current power source connected to said electrodes, and a high-frequency-generator also connected to said electrodes to initiate a breakdown arc across the space therebetween during each half cycle of said alternating-current power source, said power source being operable to superimpose a welding arc on said breakdown arc thereby forming retreating balls of molten metal on the respective ends of said electrodes until the molten ball on said protruding electrode seats in said tube a predetermined distance to form a good electrical contact between said article and said tube, and said welding arc being automatically extinguished when the distance between said retreating balls reaches a predetermined length.

16. In an electric-fusion-welding system the combination, comprising an elongated article protruding from a tube, an extended portion of said article being gripped and cut at a predetermined point from said tube to provide a pair of welding electrodes including a protruding electrode and a gripped electrode, an alternating-current power source connected to said electrodes, means connected to said electrodes for applying power from said source to said electrodes, a high-frequency-generator, means for connecting the output of said generator to said electrodes to initiate a breakdown arc across the space between said electrodes during each half cycle of said power source, said power-source applying means being operable to superimpose a welding arc on said breakdown arc thereby forming retreating balls of molten metal on the respective ends of said electrodes and to sustain said welding arc until the ball on said protruding electrode seats in said tube a predetermined distance to form a good electrical contact between said article and said tube, and means for energizing said high-frequency-generator.

17. In an electric-fusion-welding system the combination, comprising an elongated article protruding from a tube, an extended portion of said article being gripped and cut at a predetermined point from said tube to provide a pair of welding electrodes, including a protruding electrode and a gripped electrode, an alternating-current power source, means for applying power from said source to said electrodes, a high-frequency-generator, the output of which is adapted to be superimposed upon the power from said source to initiate a breakdown arc across the space between said electrodes during each half cycle of the power source, said power source being adapted to produce a welding arc simultaneously with initiation of said breakdown arc thereby forming retreating balls of molten metal on the respective ends of said electrodes and to sustain said welding arc until the ball on said protruding electrode seats in said tube a predetermined distance to form a good electrical contact between said article and said tube, means for energizing said high-frequency-generator, and arc-arresting means operable to cause termination of the welding arc when an increased voltage peak occurs in the power source as well as when the distance between said retreating balls reaches a predetermined length.

References Cited in the file of this patent
UNITED STATES PATENTS

| | | |
|---|---|---|
| 1,361,652 | Wetmore | Dec. 7, 1920 |
| 1,973,122 | Stoddard | Sept. 11, 1934 |
| 2,399,466 | Carlson et al. | Apr. 30, 1946 |
| 2,460,990 | Kratz et al. | Feb. 8, 1949 |
| 2,749,528 | Albrecht | June 5, 1956 |

FOREIGN PATENTS

| | | |
|---|---|---|
| 558,472 | Great Britain | Jan. 6, 1944 |